No. 778,683. PATENTED DEC. 27, 1904.
J. C. KULP.
HEATING DRUM FOR OIL STOVES.
APPLICATION FILED JAN. 7, 1904.

Witnesses:
Wesley H. Reel
Augustus B. Coppes

Inventor:
Joseph C. Kulp.
by his Attorneys,
Howson & Howson

No. 778,683. Patented December 27, 1904.

UNITED STATES PATENT OFFICE.

JOSEPH CASPER KULP, OF FARMINGDALE, NEW JERSEY.

HEATING-DRUM FOR OIL-STOVES.

SPECIFICATION forming part of Letters Patent No. 778,683, dated December 27, 1904.

Application filed January 7, 1904. Serial No. 188,141.

*To all whom it may concern:*

Be it known that I, JOSEPH CASPER KULP, a citizen of the United States, residing at Farmingdale, Monmouth county, New Jersey, have invented certain new and useful Improvements in Heating-Drums for Oil-Stoves, of which the following is a specification.

The object of my invention is to construct a device of cheap and simple character whereby the flame of an oil-stove, lamp, or gas-burner may be effectively used for heating the air in a room or apartment. This object I attain in the manner hereinafter set forth, reference being had to the accompanying drawings, in which—

Figure 1:
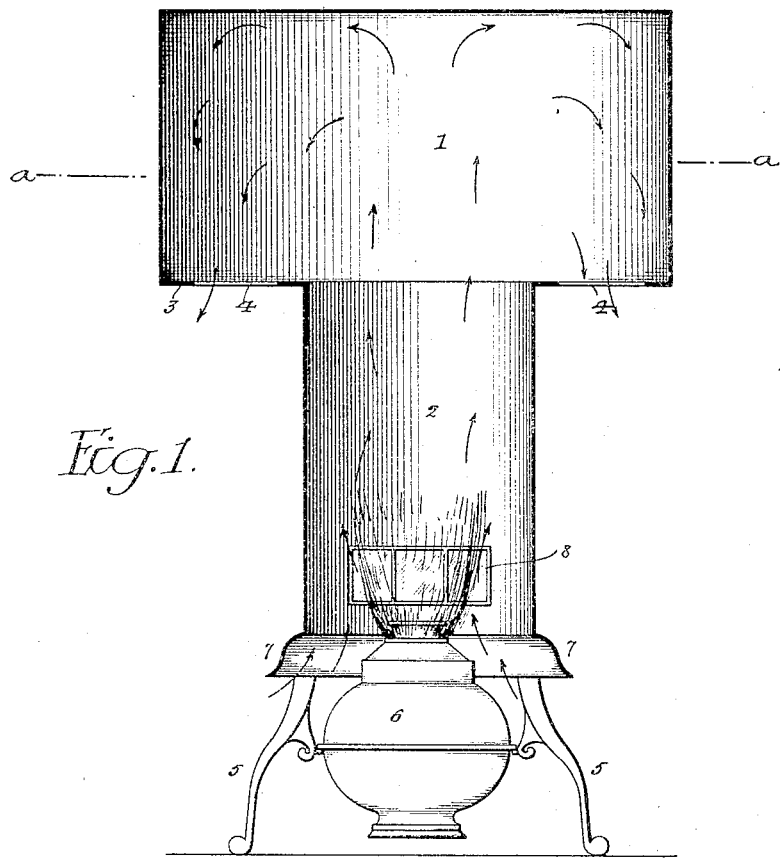
Figure 2:
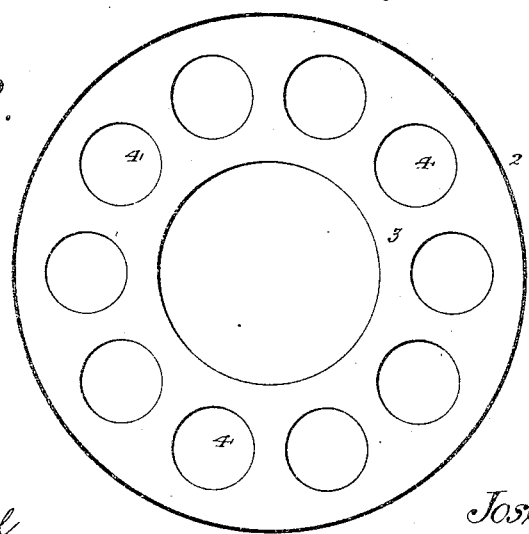

Figure 1 is a vertical section of a heating-drum for oil-stoves constructed in accordance with my invention; and Fig. 2 is a sectional plan view on the line $a$ $a$, Fig. 1.

Many different forms of radiating devices to be heated by the flame of an oil-stove, lamp, or gas-burner have heretofore been proposed; and the object of my invention is to cheapen and simplify the construction and increase the efficiency of such devices.

As shown in the accompanying drawings, my improved radiator is composed of upper and lower drums 1 and 2, which are in free communication with each other, the upper drum being closed at the top and being of larger diameter than the lower drum, a horizontal annulus 3, with perforations 4, connecting the two drums. The lower drum is open at the bottom and is mounted upon suitable legs 5 or other desired supports, which also serve to support the bowl or font 6 of the lamp, the latter being so disposed that its burner portion projects upwardly into the open lower end of the drum 2, which is preferably provided at the bottom with a flaring flange 7 for directing the air inwardly toward the burner of the lamp. The drum 2 also has on one side a glazed opening 8, through which the flame of the lamp can be seen.

The flame from the burner of the lamp rises in the drum 2, as shown, said drum serving as a chimney for the lamp and soon becoming highly heated, as do also the top and walls of the upper drum 1. Two independent means of heating the air in the room are thus provided, the first being the direct radiation from the highly-heated walls of the drums 1 and 2 and the highly-heated top of the latter and the second being the air heated by direct contact with the flame of the lamp, which after rising through the drums 1 and 2 is directed downwardly adjacent to the outer walls of the upper drum and escapes into the room through the perforations 4 in the annulus 3.

The aggregate area of the perforations 4 is considerably in excess of the area provided for inflow of air at the lower end of the drum 2, so that free escape of the expanded air and products of combustion through the perforations 4 is permitted and there is no obstruction of the draft of the lamp.

It will be evident that a heating device of the character described is of extremely cheap and simple construction, and I have found in practice that it is very effective as a means of heating a room or apartment, the downward discharge of the heated air from the perforations 4 being directed toward the floor and carrying with it the heat radiated from the walls of the lower drum 2. Hence the heat is applied at the most effective point for accomplishing the proper heating of the air in the room.

Although I have described my invention as used in connection with an oil-lamp, it will be evident that a gas-burner might be used instead of the lamp, if desired.

Having thus described my invention, I claim and desire to secure by Letters Patent—

1. A lamp-heated radiator, consisting of a pair of superposed vertical drums, in free communication at their point of junction, the upper drum being of larger diameter than the lower drum, and the walls of both drums being exposed directly to the air of the room or apartment to be heated, the upper drum being closed at the top, the lower drum receiving the flame from the burner at the bottom, and the two drums being connected by a perforated annulus, through which the air heated by direct contact with the flame is caused to flow downwardly from the outer portion of the upper drum, substantially as specified.

2. A lamp-heated radiator, consisting of a pair of superposed vertical drums, in free communication at their point of junction, the upper drum being of greater diameter than the lower drum, and the walls of both drums being exposed directly to the air of the room or apartment to be heated, the upper drum being closed at the top, and the lower drum being open at the bottom for receiving the flame from the burner, the two drums being connected by a perforated annulus, through which the air heated by contact with the flame of the lamp is caused to pass downwardly from the outer portion of the upper drum, the area of the outlet through said annulus being in excess of the area of air-inlet at the bottom of the lower drum, substantially as specified.

JOSEPH CASPER KULP.

Witnesses:
ADDIE GARRISON KULP,
E. J. KULP.